M. W. Baldwin,
Steam-Engine Valve-Gear.
N°. 10,007. Patented Sep. 13, 1853.
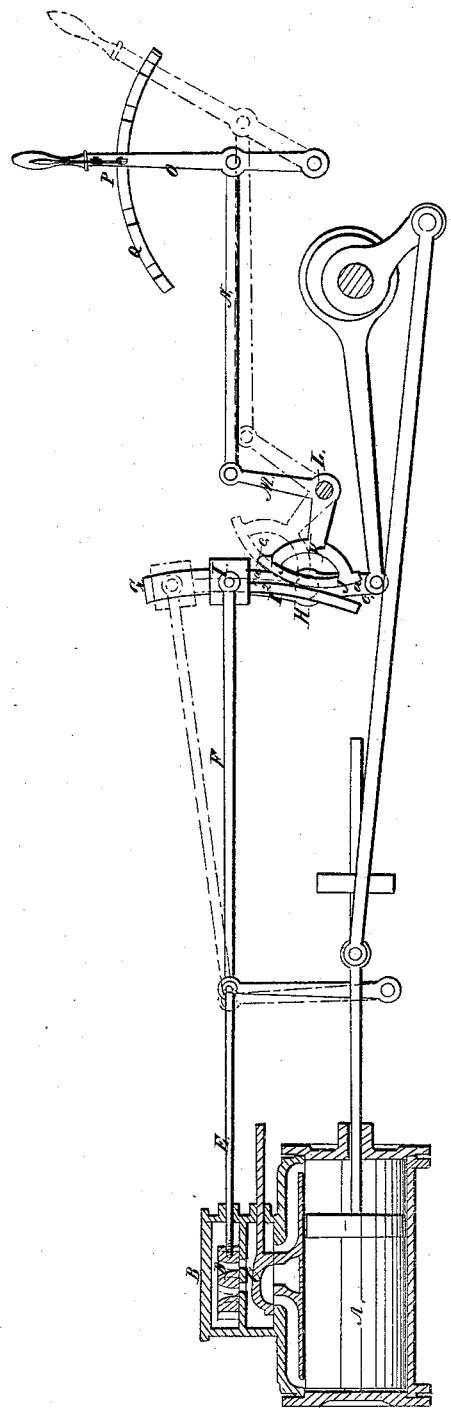

UNITED STATES PATENT OFFICE.

M. W. BALDWIN, OF PHILADELPHIA, PENNSYLVANIA.

GEAR OF VARIABLE CUT-OFF VALVES FOR STEAM-ENGINES.

Specification of Letters Patent No. 10,007, dated September 13, 1853.

*To all whom it may concern:*

Be it known that I, MATTHIAS W. BALDWIN, of the city and county of Philadelphia and State of Pennsylvania, have invented certain new and useful Improvements in Gears of Variable Cut-Off Valves for Steam-Engines, of which the following is a full, clear, and exact description, reference being had to the annexed drawing, which makes part of this specification, and which represents a side elevation of the valve-gear and a vertical section through the cylinder and valves of a locomotive-engine.

The steam cylinder (A), with its valve chest (B), steam and exhaust valve (C), and independent cut off valve (D), are severally constructed and arranged in the manner in which I usually construct my engines and my present improvement, therefore, does not relate to these parts, but only to the mechanism for varying the period at which the cut off valve acts to interrupt the flow of steam from the boiler into the cylinder.

The stem (E), of the cut off valve (D), is connected by a rod (F), with a vibrating arm (G), on a rock shaft (H), kept oscillating in the usual manner by an eccentric on the shaft of the driving wheel. The connecting rod (F), instead of being jointed directly to the arm (G), is jointed to a block (I), that slides up and down upon the arm. This block has a stem (I²), projecting from it which is connected by straps (a, &c.) to a quadrant by turning which the block is moved in or out from the rock shaft in order that the constant angular motion of the arm (G), may, by acting at a longer or shorter radius, cause the valve to cut off the steam sooner or later in the usual manner.

The quadrant (J) for varying the position of the sliding block (I) to vary the action of the cut off valve is mounted on the forked arm (K) of a rock-shaft (L) which has a second arm (M) standing at an angle of about ninety degrees to the arm of the quadrant, this second arm is connected by a rod (N) to a hinged hand lever (O) fitted with a spring latch bolt (P) that takes into any one of a series of notches in a bar (Q) to hold the lever in any position in which it may be set. This hand lever is placed within the reach of the engine-man, so that by moving it forward or back, he may push the rod (N) forward or back to turn the sector (J) and shorten or lengthen the radius of the pivot block (I) which gives motion to the valve through the connecting rod (F).

The circumference of the sector is in such a position that, if the axis of the shaft (H) were prolonged it would intersect it, so that in whatever position the sector may be placed, it will act with the same radius to move the block (I) and if toothed, would always gear into the teeth of the stem (I²) to the proper depth.

The principle of varying the cut off by means of a vibrating arm and sliding pivot block has long been known, but the contrivances for changing the position of the block upon the arm have been very defective. The radius of motion of the link by which the sliding block is changed on the arm, and the radius of motion of that part of the vibrating arm on which the block is placed have in this kind of valve gear as heretofore constructed been different, which produced a continual rubbing of the sliding block upon the arm while the arm is vibrating, and as the block for the greater part of the time occupies one position on the arm, and only has to be moved toward either extreme occasionally, that part of the arm on which the block is most used, soon becomes so worn that the block is loose and jars,—this can only be remedied by dressing up the arm throughout its entire length, for if the brasses of the block were set up so as to make the block fit on the narrow portion of the arm, it could not be moved toward the extremes. To remedy these defects in the link motion, has long been a desideratum. The plan, however, of most engines now built, does not admit of the position of the parts of the old motion being so disposed to avoid the difficulties specified, while my improvement can with the greatest facility be applied to any of them.

This contrivance I have essayed and find that it works well, in practice overcoming all the difficulties incident to the use of the numerous other gearing for variable cut off valves of which I have a knowledge, and because of the superiority of this device in practice, I desire to patent it, and therefore claim—

The arrangement of the sliding pivot block (I) fitted with a stem (I²) connected with the sector (J) by straps, chains, or cogs, the hand lever (O) and the intermediate connecting mechanism as herein described.

In testimony whereof, I have hereunto subscribed my name.

M. W. BALDWIN.

Witnesses:
HENRY SIMPSON,
DANIEL McKINKLEY.